United States Patent [19]
Pax, Jr. et al.

[11] Patent Number: 5,328,227
[45] Date of Patent: Jul. 12, 1994

[54] EXTENDABLE PIVOTED VISOR PANEL

[75] Inventors: Ralph A. Pax, Jr.; Scott T. Williams, both of Holland, Mich.

[73] Assignee: Prince Corporation, Holland, Mich.

[21] Appl. No.: 127,755

[22] Filed: Sep. 27, 1993

[51] Int. Cl.$^5$ ............................................. B60J 3/02
[52] U.S. Cl. ............................. 296/97.8; 296/97.5; 296/97.9
[58] Field of Search .............. 296/97.1, 97.4, 97.5, 296/97.8, 97.9, 97.11, 97.12, 97.13; 160/370.2, DIG. 3

[56] References Cited
U.S. PATENT DOCUMENTS

| | | | |
|---|---|---|---|
| 4,929,014 | 5/1990 | Clark et al. | 296/97.8 |
| 4,989,910 | 2/1991 | Mersman et al. | 296/97.4 |
| 5,067,764 | 11/1991 | Lanser et al. | 296/97.8 X |
| 5,192,110 | 3/1993 | Mykytiuk et al. | 296/97.8 |

FOREIGN PATENT DOCUMENTS 133227 5/1990 Japan .................................. 296/97.8

Primary Examiner—Joseph D. Pape
Attorney, Agent, or Firm—Price Heneveld Cooper DeWitt & Litton

[57] ABSTRACT

A visor system includes a visor panel and guide for movably mounting the visor panel above the headliner of a vehicle. The guide includes an exit through which the visor panel extends when moved from a stored position above the headliner to a use position. The visor assembly further includes a pivot rod mounted near the exit for selectively engaging pivot rod engaging structure on the visor panel only when the visor panel is extended. One of the visor pivot rod engaging structure or pivot rod includes a torque control for providing a controlled torque for pivoting and holding the visor between selected use positions once extended. The pivot rod engaging structure decouples from the pivot rod as the visor is again retracted into the stored position.

20 Claims, 3 Drawing Sheets

EXTENDABLE PIVOTED VISOR PANEL

BACKGROUND OF THE INVENTION

The present invention relates to vehicle visors and particularly to a visor which extends from a concealed storage position to a use position and while doing so couples to a pivot control mechanism.

In the design of visor systems, and particularly those for use in modern vehicles, it is desirable to provide a visor which is concealed behind the vehicle headliner so that, when in a stored position, the visor is essentially hidden from view. This provides a more aesthetically appearing vehicle interior as well as eliminates the visor as a potential safety problem in the event of an accident.

A variety of slide-out visors have been proposed, including those shown in U.S. Pat. Nos. 4,989,910 and 4,929,014, both of which are assigned to the present assignee. These visors provide, in the first instance, a slide-out visor which includes a pivot control mechanism which is attached to and moves with the visor panel as it travels from a stored position behind the vehicle headliner to an extended use position. Although such visors perform their desired design goals, the movement of the pivot control mechanism for the visor, together with the visor panel, is somewhat difficult to achieve requiring close manufacturing tolerances to assure ease of control of the visor in its movement between stored and use positions.

SUMMARY OF THE INVENTION

The visor of the present invention improves upon the slide-out, pivoted visor assemblies of the prior art by providing a visor panel and guide means for movably receiving the visor panel above the headliner of a vehicle. The visor panel extends through an exit end of the guide means and transfers into a pivot rod when moved from a stored position to a use position. For such purpose, the visor panel includes pivot rod engaging means for engaging the pivot rod as the visor panel is extended from the guide means. In a preferred embodiment, one of the visor pivot rod engaging means or pivot rod includes torque control means for providing a controlled torque for pivoting and holding the visor between selected use positions once extended. The pivot rod engaging means decouples from the pivot rod and the visor panel transfers to the guide means as the visor is retracted into the stored position.

Such an assembly provides a relatively inexpensive visor panel which can move freely between stored and use positions and which selectively couples to a pivot rod mounted to the vehicle for controlling the adjusted position of the visor once extended. These and other features, objects and advantages of the present invention will become apparent upon reading the following description, thereof, together with reference to the accompanying drawings in which:

DETAILED DESCRIPTION OF THE PREFERRED EMBODIMENT

Figure 1:
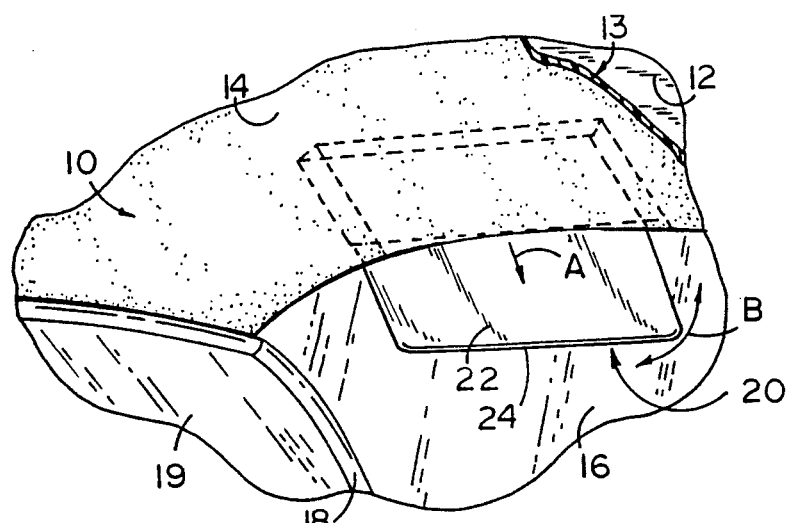
FIG. 1 is a fragmentary perspective view of a vehicle incorporating a visor embodying the present invention.

Referring initially to FIG. 1 there is shown a vehicle 10 such as an automobile which includes a visor assembly 20 constructed according to the present invention. Vehicle 10 includes a sheet metal roof assembly 12 covered by a decorative headliner 13 extending from the top of the windshield 16 under and covering the sheet metal roof 12. The vehicle includes an A-pillar 18 which extends between the windshield and a side window 19 of the vehicle, the driver's side being shown in FIG. 1. The visor assembly 20 can be extended to a use position shown in FIG. 1 from a retracted position shown in phantom form in FIG. 1 by pulling the visor downwardly in a direction indicated by arrow A in FIG. 1 from behind the headliner 13 after which the visor can be pivoted forwardly toward the windshield or rearwardly to a more vertically adjusted position as indicated by arrow B for positioning the visor in a selected use position.

Figure 3:
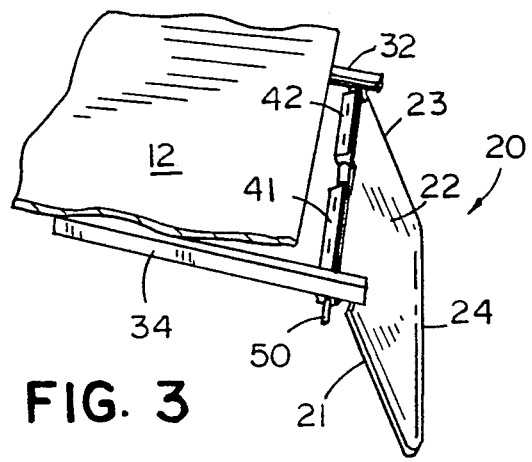
FIG. 3 is a right side, upper perspective view of the visor system shown in FIGS. 1 and 2 shown with the visor in an extended, use position.
Figure 2:
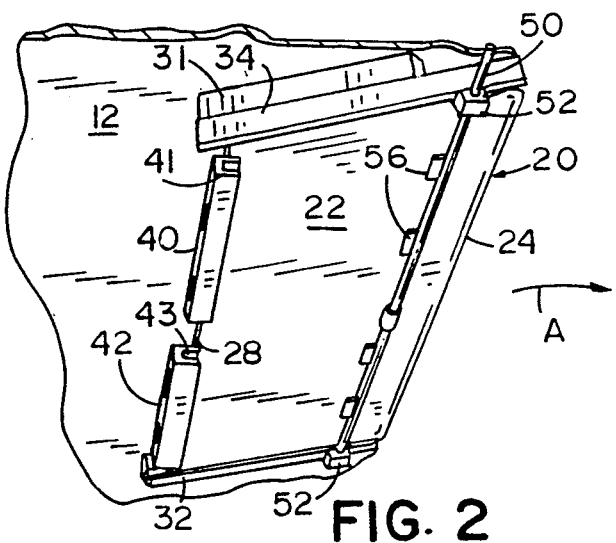
FIG. 2 is a bottom perspective view of the visor system of the present invention shown with the vehicle headliner removed and the visor shown in a retracted, stored position.
Figure 4:
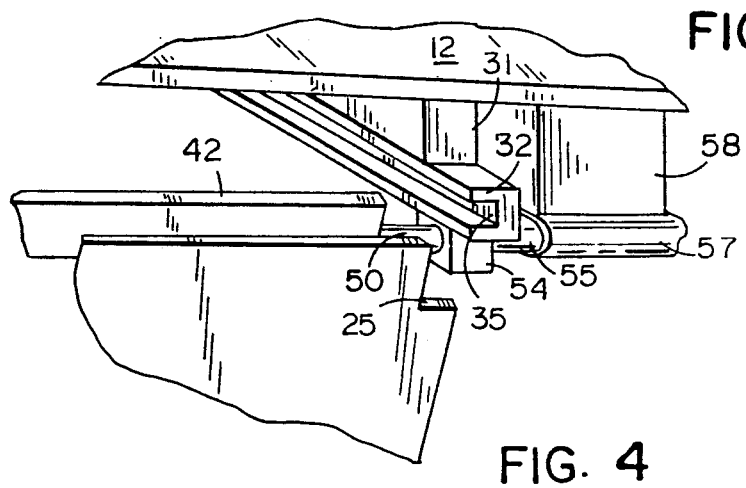
FIG. 4 is an enlarged, fragmentary perspective view of the left front corner of the visor assembly shown in FIGS. 1-3.

As best seen in FIGS. 2 and 3, the visor assembly 20 includes a relatively thin, planar visor panel 22 which can be molded of a polymeric material such as polycarbonate and which includes a forward rim 24 defining, in part, a handle which permits easy grasping and control of the visor. The visor panel 22 is slidably mounted to the vehicle by guide means comprising a pair of spaced parallel facing generally U-shaped channels 32 and 34 which are secured either to the underlying roof 12 of the vehicle or to the top side of the headliner 13 in the event the visor assembly 20 is integrated into an overall headliner system. Thus, the visor panel 20, which has opposed edges 21 and 23 (FIG. 3), easily slides within the slots 35 (FIG. 4) of each of the channels 32 and 34 for extending and retracting from behind the headliner as seen in FIG. 1. The guide channels 32 and 34 are made of a lubricious polymeric material such as polyvinylchloride and can be secured to the roof 12 as seen in FIG. 4 by suitable mounting blocks 31 or mounted to the upper surface of the headliner 13. As seen in FIG. 4, the visor panel 22 includes a notch 25 in each corner such that when extended, the edges of the panel 22 disengage from the guide channels while engaging the pivot rod 50 (FIGS. 2 and 3) to allow pivoting of the visor panel as described below.

Visor panel 22 includes a trailing edge 28, opposite rim 24, which includes pivot rod engaging members 40 and 42 (FIGS. 2-3 and 6-7) which selectively couple and decouple to a pivot rod 50 which is mounted to the vehicle in lineally fixed relationship at the exit end of channels 35 but allowed to rotate. In this embodiment, the pivot rod or axle is mounted to the roof 12 of the vehicle as seen in FIG. 2 by means of a first mounting boss 52 on the left end of the cylindrical pivot rod and a second mounting boss 54 on the right side of the visor assembly with the mounting bosses 50 and 52 being journaled to receive the cylindrical pivot rod and being mounted on the outside of and spaced slightly below the guide tracks 32 and 34 as best seen in FIG. 4.

The visor pivot rod 50 may include a flat formed on its right end 55 which extends within a conventional spring-steel torque control 57 (FIG. 4) mounted to the vehicle roof 12 by means of a spacer block 58 for controlling the visor movement between a detented, selected lower use position and a detented, raised position in which the plane of the substantially flat planar visor body 22 is aligned with the guide channels 32 and 34. The generally U-shaped torque control 57 provides a controlled holding force and torque for the rotational adjustment of the visor between the two detented positions in a conventional manner.

Figure 5:
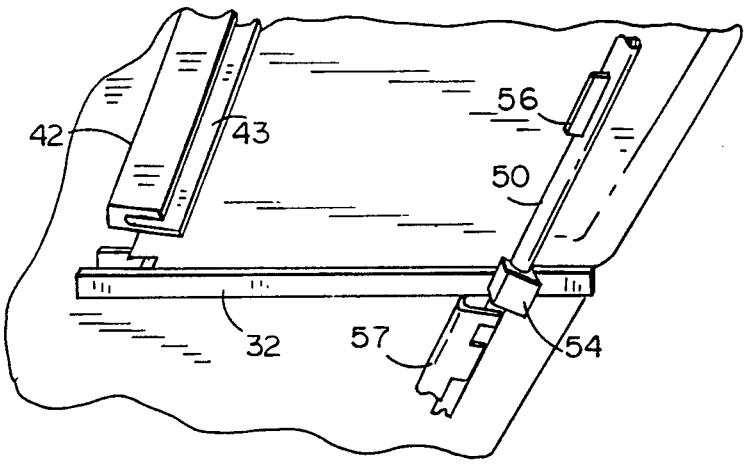
FIG. 5 is a fragmentary, bottom perspective view of the left side of the visor shown in a partly extended position.

For purposes of coupling and decoupling the visor panel to the pivot rod, the pivot rod engaging means 40 and 42 comprises a pair of generally U-shaped channel members having forwardly facing open channels 41 and 43 as best seen in FIG. 2 and which are mounted on the lower surface of the visor to position the channels in coaxial alignment with the pivot rod 50 below the guide channels 32 and 34. Engaging means 40 and 42 include a plurality of spaced slots 46 (FIGS. 6 and 7) formed in the generally vertically extending wall 47 of each of the engaging means for receiving interlocking tabs 56 (FIGS. 5 and 6) which extend rearwardly on the pivot rod. Tabs 56 engage and inter-fit within slots 46 as seen in FIG. 7 when the visor is in its fully extended position to couple the visor panel 20 to the pivot rod 50 for synchronous movement of the visor panel and pivot rod 50 with the torque control 57 controlling the pivotal motion of the visor in a direction indicated by arrow B of FIG. 1.

Figure 6:
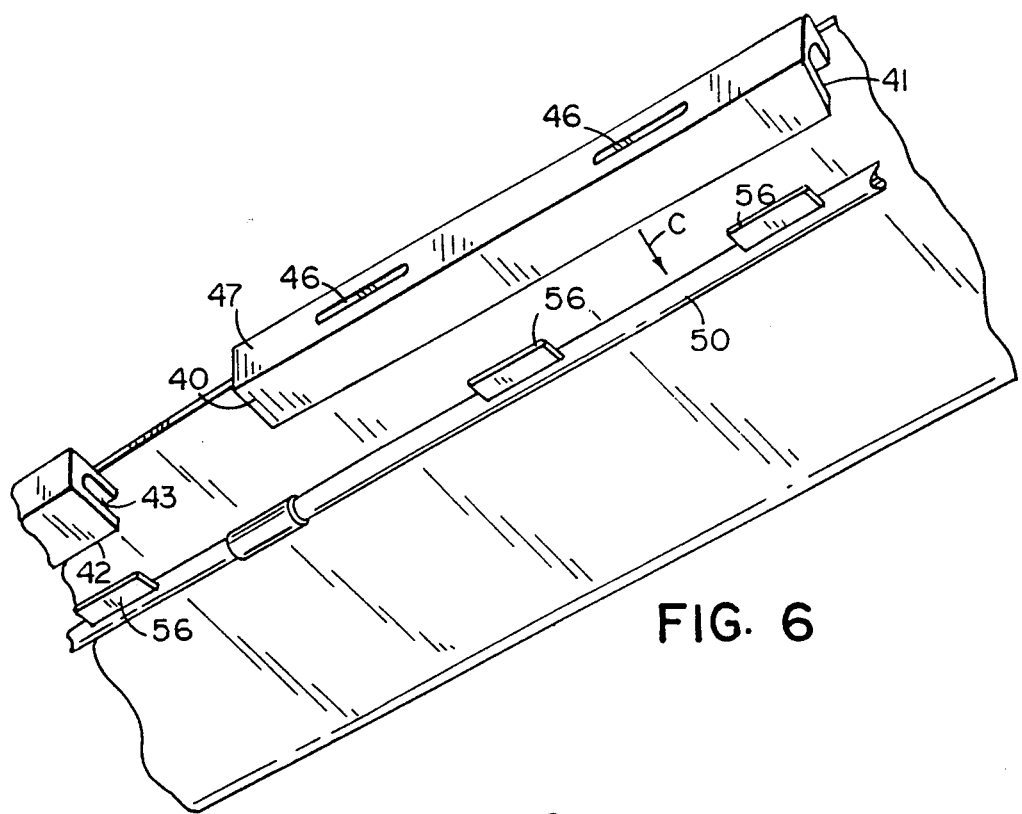
FIG. 6 is an enlarged fragmentary bottom and rear perspective view of a portion of the visor assembly shown in a nearly fully extended position.
Figure 7:
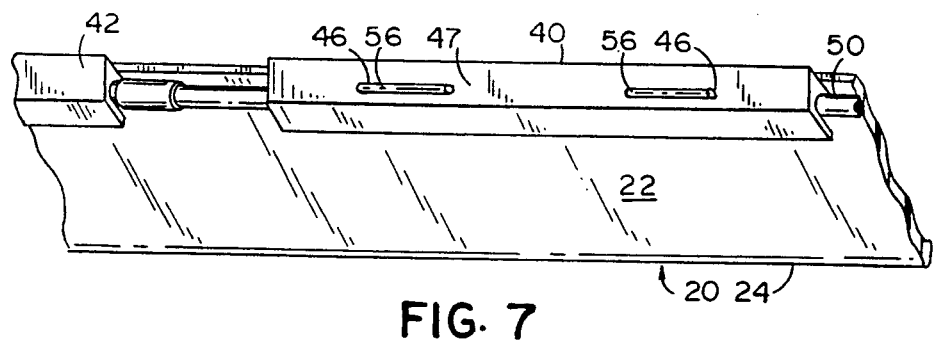
FIG. 7 is an enlarged fragmentary bottom and rear perspective view of the same portion of the visor assembly shown in its fully extended position.

Thus, by use of the engaging means 40 and 42, the visor panel 20 selectively couples to the pivot rod 50 and as the visor is progressively slid from a stored position shown in FIG. 2 toward the visor rod, as illustrated by arrow C in FIG. 6, to a coupled and lockably engaged position shown in FIG. 7 for subsequent pivoting movement utilizing the visor rod as illustrated in FIGS. 1, 3 and 4. By attaching the visor rod 50 to the vehicle using mounting bosses 52 at opposite ends, the visor rod can be precisely positioned with respect to the vehicle roof and headliner and the guide channels and visor panel construction can be simplified since the visor rod only rotates and does not translate (i.e. move lineally) with respect to the vehicle roof or headliner. This allows easier and smoother movement of the visor panel from the stored position to a use position and precise control of the visor rod in its rotation with respect to the vehicle. Thus, by providing a decoupling visor panel and its associated rotational adjustment means, a unique and improved slide-out visor system is provided.

Figure 8:
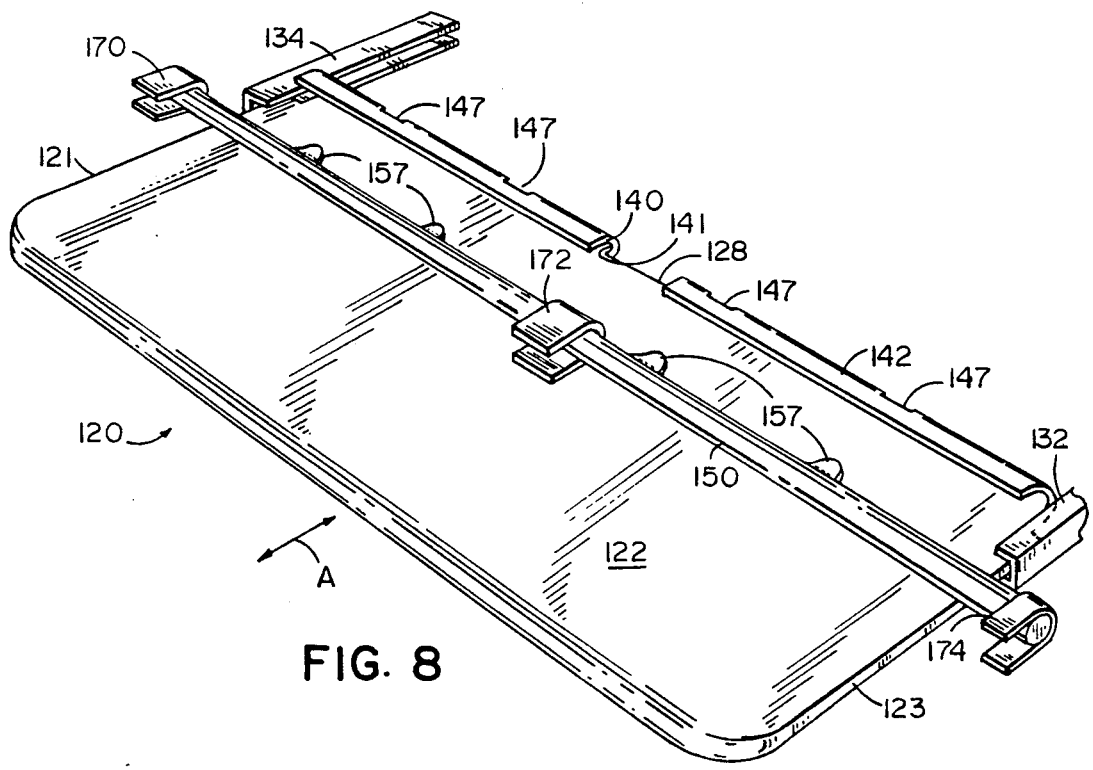
FIG. 8 is a top frontal perspective view of an alternative embodiment of the visor of the present invention.
Figure 9:
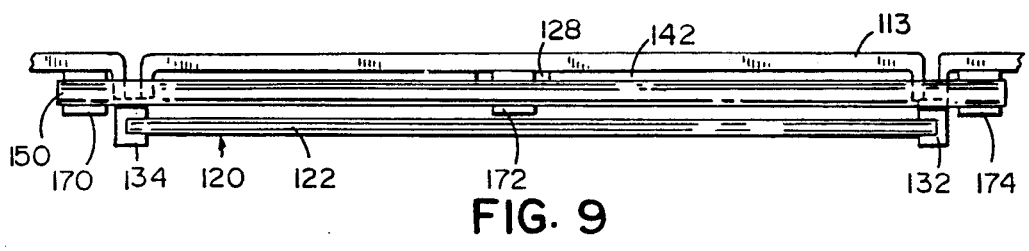
FIG. 9 is a front elevational view of the visor shown in FIG. 8, shown installed in a vehicle.

In another embodiment of the invention shown in FIGS. 8 and 9, a somewhat similar visor system 120 is disclosed with elements corresponding to the first embodiment similarly numbered proceeded with the reference numeral 1. In this embodiment, a visor panel 122 is integrally molded to include channel-shaped engaging means 140 and 142 at a trailing edge 128 of the panel 122. Panel 122 includes opposed edges 121 and 123 which slidably fit within stationary channels 132 and 134 as in the first embodiment. Engaging means 140 and 142 also include slots 147 spaced therealong and in alignment with tabs 157 of a pivot rod 150 which is mounted to the roof 113 of a vehicle by means of three spaced, generally U-shaped detent springs 170, 172 and 174 for holding the pivot rod in place while providing a predetermined, rotational torque between the rod and the vehicle. As with the first embodiment, the visor panel 122 can be extended and retracted in a direction indicated by arrow A in FIG. 8 such that the engaging means 140 and 142 selectively engage the pivot rod 150 to control of the visor once fully extended.

In another embodiment of the invention, the visor rod 150 of the FIGS. 8 and 9 embodiment is fixedly secured to mounting members 170, 172 and 174 and tabs 157 are removed from the rod as shown in phantom lines in FIG. 8. In this embodiment, the resilient polymeric integral engaging means 140 and 142 of the visor panel include channels 141 which are dimensioned to frictionally and rotationally engage the cylindrical pivot rod 150 such that the desired rotational torque control of the visor panel 122, once extended, is provided between a stationary pivot rod 150 and the semi-cylindrical channels 141 of the engaging means. In all embodiments, however, the visor panel includes a trailing edge with engaging means which selectively engage the pivot rod which is either rotationally mounted to the vehicle or stationarily mounted to the vehicle such that the visor panel can slide into engagement with the pivot rod for subsequent rotation once extended forwardly from behind the vehicle headliner to a use position for downward pivoted adjustment as desired.

It will become apparent to those skilled in the art that various modifications to the preferred embodiments of the invention described therein can be made without departing from the spirit or scope thereof as defined by the appended claims.

The embodiments of the invention in which an exclusive property or privilege is claimed are defined as follows.

1. A visor system for a vehicle comprising:
   guide means for mounting to a vehicle above a vehicle headliner for movably receiving a visor panel for movement between a stored position behind the headliner and a use position extended from the headliner;
   a visor panel including pivot rod engaging means, said panel coupled to said guide means for movement between stored and use positions;
   a pivot rod including means for mounting said pivot rod to a vehicle and near an exit end of said guide means to be engaged by said pivot rod engaging means when said visor panel is extended; and
   one of said visor panel and pivot rod including torque control means for controlling the rotational adjustment of said visor once extended from a stored position.

2. The visor assembly as defined in claim 1 wherein said means for mounting said pivot rod rotationally mounts said pivot rod to the vehicle and said torque control extends between said pivot rod and the vehicle for controlling the rotation of said pivot rod.

3. The visor system as defined in claim 1 wherein said visor panel includes a leading edge and a trailing edge and wherein said pivot rod engaging means comprises at least one channel member having an open side for circumscribing at least a portion of said pivot rod when said visor panel is extended for use, and wherein said engaging means is mounted adjacent said trailing edge of said visor panel.

4. The visor system as defined in claim 3 wherein said engaging means further includes slot means and wherein said visor pivot rod includes tab means extending in alignment with said slot means for lockably and releasably coupling said visor panel to said pivot rod when said visor panel is in an extended use position.

5. The visor assembly as defined in claim 1 wherein said means for mounting said pivot rod fixedly mounts said pivot rod to the vehicle and said torque control is integral with said pivot rod engaging means.

6. A visor system for a vehicle comprising:
   guide means for mounting to a vehicle above a vehicle headliner for movably receiving a visor panel for movement between a stored position behind the headliner and a use position extended from the headliner;
   a visor panel including pivot rod engaging means, said panel coupled to said guide means for movement between stored and use positions; and
   a pivot rod including means for mounting said pivot rod to a vehicle and near an exit end of said guide means to be engaged by said pivot rod engaging means when said visor panel is extended for adjustment of said visor once extended from a stored position.

7. The visor system as defined in claim 6 wherein said visor panel includes a leading edge and a trailing edge and wherein said pivot rod engaging means comprises at least one channel member having an open side for circumscribing at least a portion of said pivot rod when said visor panel is extended for use, and wherein said engaging means is mounted adjacent said trailing edge of said visor panel.

8. The visor assembly as defined in claim 7 wherein said means for mounting said pivot rod rotationally mounts said pivot rod to the vehicle and further including a torque control extending between said pivot rod and the vehicle for controlling the rotation of said pivot rod.

9. The visor system as defined in claim 8 wherein said engaging means further includes slot means and wherein said visor pivot rod includes tab means extending in alignment with said slot means for lockably and releasably coupling said visor panel to said pivot rod when said visor panel is in an extended use position.

10. A slide-out visor system for a vehicle comprising:
    a visor panel and guide means for slidably mounting said visor panel to a vehicle, said guide means including an exit end through which said visor panel extends when moved from a stored position;
    a pivot rod including means for mounting said pivot rod adjacent said exit end of said guide means; and
    means for releasably holding said visor panel to said pivot rod such that said visor panel engages said pivot rod only when said visor panel is moved to an extended use position and is released from said pivot rod when said visor panel is retracted to a stored position.

11. The visor system as defined in claim 10 wherein said means for releasably locking comprises at least one channel-shaped member on a trailing edge of said visor panel for circumscribing said pivot rod for holding said visor panel on said pivot rod when extended from said guide means.

12. The system as defined in claim 11 wherein said mounting means rotatably mounts said pivot rod.

13. The visor system as defined in claim 12 wherein said channel-shaped member includes slot means and wherein said pivot rod includes tab means extending in alignment with said slot means or lockably and releasably coupling said visor panel to said pivot rod when said visor panel is in an extended use position.

14. A slide-out visor system for a vehicle comprising:
    a visor panel;
    guide means for releasably and slidably mounting said visor panel to a vehicle, said guide means including an exit end through which said visor panel extends when moved from a stored position;
    a pivot rod including means for mounting said pivot rod adjacent an exit end of said guide means; and
    means for releasably holding said visor panel to said pivot rod such that said visor panel transfers from said guide means onto said pivot rod only when said visor panel is moved to an extended use position and is released from said pivot rod and transfers onto said guide means when said visor panel is retracted to a stored position.

15. The visor system as defined in claim 14 wherein said visor panel includes a leading edge and a trailing edge and wherein said means for releasably holding said visor panel to said pivot rod comprises at least one channel member mounted adjacent said trailing edge of said visor panel and having an open side for circumscribing at least a portion of said pivot rod when said visor panel is extended for use.

16. The visor assembly as defined in claim 15 wherein said means for mounting said pivot rod rotationally mounts said pivot rod to the vehicle. Torque control extends between said pivot rod and the vehicle for controlling the rotation of said pivot rod.

17. The visor system as defined in claim 16 wherein said channel member includes slot means and wherein said visor pivot rod includes tab means extending in alignment with said slot means for lockably and releasably coupling said visor panel to said pivot rod when said visor panel is in an extended use position.

18. The visor system as defined in claim 17 and further including one of said visor panel and pivot rod including torque control means for controlling the rotational adjustment of said visor once extended from a stored position.

19. The visor system as defined in claim 14 wherein said pivot rod is fixedly mounted with respect to said guide means and positioned below said guide means, and wherein said means for releasably holding said visor panel to said pivot rod comprises a channel member on an underside of said visor panel and including an opening facing said pivot rod for selectively engaging said pivot rod.

20. The visor system as defined in claim 19 wherein said guide means comprises a pair of facing, spaced generally parallel channels for mounting to one of the vehicle roof or headliner.

* * * * *